Figure 1:
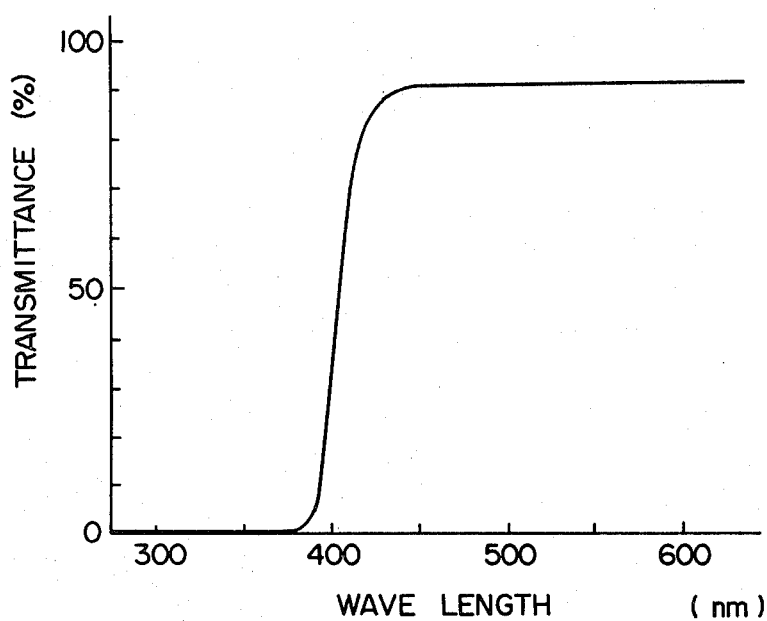

United States Patent
Araki et al.

[11] 4,431,762
[45] Feb. 14, 1984

[54] ULTRAVIOLET LIGHT SCREENING RESIN COMPOSITION

[75] Inventors: Shingo Araki, Settsu; Keizo Asai, Suita; Seibei Ono, Nagaokakyo, all of Japan

[73] Assignee: Dainippon Ink & Chemicals Inc., Tokyo, Japan

[21] Appl. No.: 400,383

[22] Filed: Jul. 21, 1982

[30] Foreign Application Priority Data

Jul. 23, 1981 [JP] Japan .................. 56-114463

[51] Int. Cl.³ .............................. C08K 5/20
[52] U.S. Cl. .................... 524/220; 524/89; 524/109; 524/111; 524/217; 524/222
[58] Field of Search ............. 524/89, 111, 220, 222; 564/158, 166, 173; 549/460; 8/508, 510, 512, 513, 518; 106/176, 186; 260/765, 800, 810; 548/441; 523/124, 125

[56] References Cited

U.S. PATENT DOCUMENTS

| | | | |
|---|---|---|---|
| 1,935,930 | 11/1933 | Zitscher et al. | 564/158 |
| 1,960,375 | 5/1934 | Gassner et al. | 564/158 |
| 2,144,704 | 1/1939 | Muth | 548/441 |
| 2,249,537 | 7/1941 | McDowell et al. | 524/217 |
| 2,653,927 | 9/1953 | Graenacher et al. | 549/460 |
| 2,653,928 | 9/1953 | Graenacher et al. | 549/460 |
| 2,911,314 | 11/1959 | Armento et al. | 524/89 |
| 2,964,494 | 12/1960 | Lappin et al. | 524/222 |
| 3,022,268 | 2/1962 | Armitage et al. | 564/158 |
| 3,389,004 | 6/1968 | Dressler et al. | 524/89 |

FOREIGN PATENT DOCUMENTS 51-70282 6/1976 Japan .
54-160630 12/1979 Japan .

*Primary Examiner*—Veronica P. Hoke
*Attorney, Agent, or Firm*—Sherman & Shalloway

[57] ABSTRACT

A resin composition containing at least one compound (A) selected from compounds of formulas

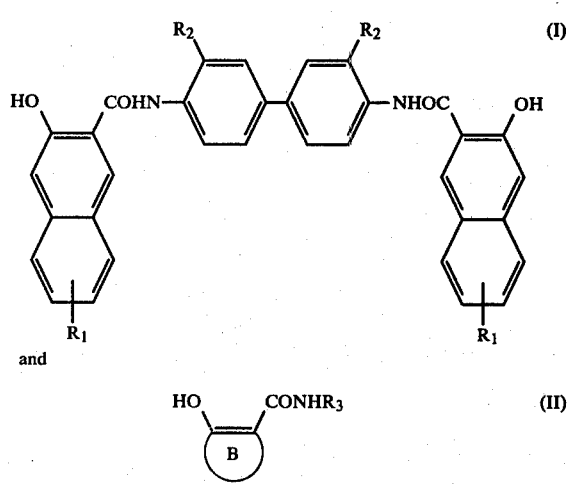

and

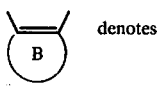

wherein $R_1$ and $R_2$ each denote a hydrogen atom, halogen atom, or alkyl or alkoxy group having 1 to 10 carbon atoms, denotes -continued
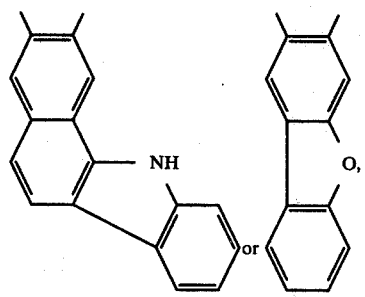
$R_3$ denotes a hydrogen atom, alkyl group containing 1 to 10 carbon atoms, naphthyl group or substituent of formula
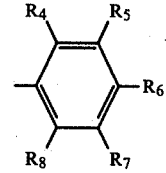
wherein $R_4$ to $R_8$, which may be the same or different, each denote a hydrogen atom, halogen atom, nitro group and alkyl or alkoxy group having 1 to 10 carbon atoms.
8 Claims, 3 Drawing Figures

ULTRAVIOLET LIGHT SCREENING RESIN COMPOSITION

This invention relates to a novel ultraviolet light screening resin composition, and more specifically to a resin composition which absorbs a light with a wavelength below 370 nm almost completely and screens the ultraviolet light substantially completely.

Ultraviolet light screening resin compositions are used in coating materials for preventing the discoloration of printed matters, photos, colored steel plates, etc. and the change of properties of foods, chemicals, liquid crystals, etc. as well as in molded articles such as films, bottles, etc.

Additives known so far for absorbing an ultraviolet light and imparting an ultraviolet light screening ability to resins are:

(1) ultraviolet absorbers such as benzophenone, benzotriazole, etc.
(2) inorganic compounds such as transparent iron oxide, finely divided titanium oxide, etc.
(3) organic dyestuffs and pigments.

However, the existing ultraviolet absorbers such as benzophenone, benzotriazole, etc. have excellent ultraviolet light absorbability, but many of them have problems with heat stability, resistance to sublimation, and compatibility with organic substances. As the transparent iron oxide and finely divided titanium oxide have low ultraviolet light absorbability, they need be added to resins in high concentrations, thus making it impossible to obtain a transparent resin composition. Further, some of the organic dyestuffs and pigments, like e.g. phthalocyanine blue, may absorb the ultraviolet light to some extent, but they have in general great absorption in a visible light wavelength zone. Therefore, when they are used, resins are colored greatly.

An object of this invention is to provide a novel ultraviolet light absorbing compound that possesses no defects ascribable to the above existing compounds (1)–(3) having the ultraviolet absorbability.

The present inventors have found that some compounds known so far as intermediates of dyestuffs and pigments and their similar compounds have strong absorbability of an ultraviolet light and excells in heat stability, sublimation resistance and compatibility with organic substances, and that when these compounds are added to resin materials, there result excellent ultraviolet light screening resin compositions.

That is, according to this invention, there is provided a resin composition containing at least one compound (A) selected from compounds of formulas

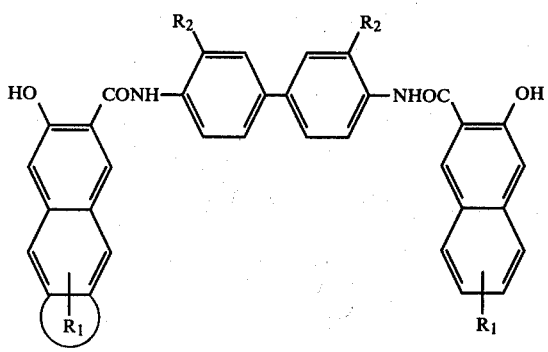

and

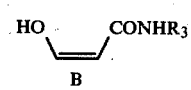

wherein $R_1$ and $R_2$ each denote a hydrogen atom, halogen atom, or alkyl or alkoxy group having 1 to 10 carbon atoms,

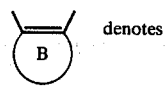 denotes

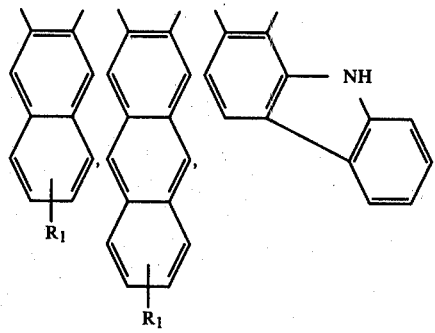

$R_3$ denotes a hydrogen atom, alkyl group having 1 to 10 carbon atoms, naphthyl group or substituent of formula

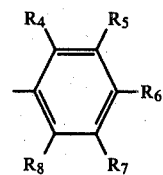

wherein $R_4$ to $R_8$, which may be the same or different, each denote a hydrogen atom, halogen atom, nitro group, or alkyl or alkoxy group having 1 to 10 carbon atoms.

Many of the compounds (A) are already known as intermediates of dyestuffs and pigments. Examples thereof include Naphthol AS(3-hydroxy-2-naphthanilide),
Naphthol AS-E(4'-chloro-3-hydroxy-2-naphthanilide),
Naphthol AS-MCA(3'-chloro-3-hydroxy-2-naphthanilide),
Naphthol AS-BS(3-hydroxy-3'-nitro-2-naphthanilide),
Naphthol AS-AN(3-hydroxy-4'-nitro-2-naphthanilide),
Naphthol AS-D(3-hydroxy-2-naphtho-O-toluidide),
Naphthol AS-RT(3-hydroxy-2-naphtho-p-toluidide), Naphthol AS-TR(4'-chloro-3-hydroxy-2-naphtho-O-toluidide),
Naphthol AS-KB(5'-chloro-3-hydroxy-2-naphtho-O-toluidide),
Naphthol AS-MX(3-hydroxy-2-naphtho-2,4-xylidide),
Naphthol AS-OL(3-hydroxy-2-naphth-O-anisidide),
Naphthol AS-CA(5'-chloro-3-hydroxy-2-naphtho-anisidide),
Naphthol AS-RL(3-hydroxy-2-naphth-p-anisidide),
Naphthol AS-LT(3-hydroxy-2'-methyl-2-naphth-p-anisidide),
Naphthol AS-BG(3-hydroxy-2',5'-dimethoxy-2-naphthanilide),
Naphthol AS-ITR(5'-chloro-3-hydroxy-2',4'-dimethoxy-2-naphthanilide),
Naphthol AS-LC(4'-chloro-3-hydroxy-2',5'-dimethoxy-2-naphthanilide),
Naphthol AS-PH(3-hydroxy-2-naphtho-O-phenetidide),
Naphthol AS-VL(3-hydroxy-2-naphtho-p-phenetidide),
Naphthol AS-BO(3-hydroxy-N-1-naphthyl-2-naphthamide),
Naphthol AS-SW(3-hydroxy-N-2-naphthyl-2-naphthamide),
Naphthol AS-BM(3,3''-dihydroxy-4',4'''-bi-2-naphtho-O-toluidide),
Naphthol AS-BR(3,3''-dihydroxy-4',4'''-bi-2-naphth-O-anisidide),
Naphthol AS-S(3-hydroxy-N-[2-methoxy-3-dibenzofuryl]-2-naphthamide),
Naphthol AS-GR(3-hydroxy-2-O-anthrotoluidide),
Naphthol AS-SR(2-hydroxy-2'-methyl-11H-benzo(a)carbazole-3-carbox-p-anisidide),
Naphthol AS-SG(2-hydroxy-11H-benzo(a)carbazole-3-carbox-p-anisidide),
Naphthol AS-LB(4'-chloro-2-hydroxy-1-carbazole-carboxanilide), and
Naphthol AS-BT(2-hydroxy-2',5'-dimethoxy-3-dibenzofuran-carboxanilide)
which are intermediates of azo-type dyestuffs and pigments. Of these, the preferable compounds excelling in the ultraviolet light absorbability, heat stability, sublimation resistance and compatibility with organic substances are the compound of formula (I) and the compound of formula (II) wherein $R_3$ denotes the naphthyl group or substituent of formula $$\begin{array}{c} R_4 \quad R_5 \\ \diagdown \, / \\ | \quad \quad \text{—} R_6 \\ / \, \diagdown \\ R_8 \quad R_7 \end{array}$$

wherein $R_4$ to $R_8$, which may be the same or different, each denote a hydrogen atom, halogen atom, nitro group, or alkyl or alkoxy group having 1 to 10 carbon atoms, and at least one of $R_4$ to $R_8$ is an alkyl or alkoxy group containing 1 to 10 carbon atoms. The most preferable compounds are Naphthol AS-ITR, Naphthol AS-LC, Naphthol AS-BM and Naphthol AS-BR.

The proportion of the compound (A) used in this invention on the basis of the resin varies greatly depending on the use purpose of the resin. However, the compound (A) is in general added in an amount of 0.005 to 900 parts by weight per 100 parts by weight of the resin, preferably 1 to 150 parts by weight on the same basis in the case of a coating resin and 0.01 to 50 parts by weight on the same basis in the case of a molding resin.

Examples of resins that can be used to form the resin composition of this invention include thermoplastic resins and thermosetting resins such as polyolefins, ethylene-vinyl acetate copolymer, polystyrene, ABS resin, polyvinyl chloride, polyvinylidene chloride, vinyl chloride-vinyl acetate copolymer, polycarbonate, acrylic resin, epoxy resin, polyester, polyamide, polyurethane, nitrocellulose and copolymers composed of monomers making up these polymers. Above all, where the compound (A) of this invention is added to the resins usually molded at high temperatures, such as polycarbonate, acrylic resin, polyester, etc., such characteristics of the compound (A) as excellent heat resistance and sublimation resistance are exhibited and a sufficient effect is provided with the addition of a small amount of the compound (A). Where the existing ultraviolet absorbers are used, the loss owing to degradation and sublimation is great. Therefore, they must be added to the above resins in large amounts.

The resin composition to which has been added the compound (A) used in this invention shows the quite excellent ultraviolet screening effect as mentioned above. The compound (A) is used similarly to the conventional ultraviolet absorbers, exhibiting an effect which is the same as or more than the conventional ones. Not only that, it is markedly effective for improving light resistance of resins added themselves and therefore can be used in coating materials for preventing the discoloration or the change of properties, molded articles such as films and bottles, and so forth.

Any of the following methods of adding the compound (A) to the resin can be suitably employed.

(1) A method wherein the compound (A) is directly added at the time of molding or processing.

(2) A method wherein a compound is prepared in advance and processed.

(3) A method wherein a master batch in a high concentration is formed and added to the resin at the time of processing.

(4) A method wherein the compound (A) is added at the time of polymerizing the resin.

Colorants such as dyestuffs, pigments, etc., fillers, stabilizers, and so forth, other than the compound (A), can be added to the resin composition of this invention if required.

The following Examples and Referential Example will illustrate the present invention.

The structure of the compound (A) used in each Example is shown in Table 1.

TABLE 1

| Example | Structure of a compound used |
|---|---|
| 1,7,15 | 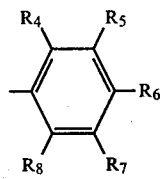 |

(Naphthol AS-ITR)

TABLE 1-continued

| Example | Structure of a compound used |
|---|---|
| 2,8,16,21,22 | 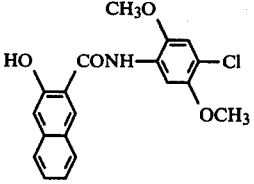 (Naphthol AS-LC) |
| 3,9,17 | 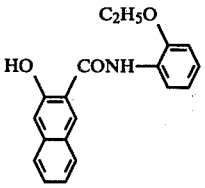 (Naphthol AS-PH) |
| 4,10,18 | 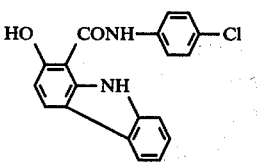 (Naphthol AS-LB) |
| 5,11,13,14,19 | 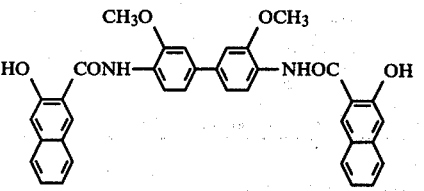 (Naphthol AS-BR) |
| 6,12,20 | 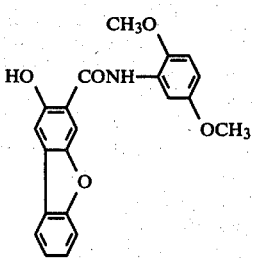 (Naphthol AS-BT) |

EXAMPLE 1-6

Each of the compounds (0.5 part by weight) shown in Table 1 was blended with 99.5 parts by weight of polymethyl methacrylate and the blend was then hot pressed at 160° C. to form a sheet 0.2 mm in thickness. It was ascertained by a microscope of 400 magnifications that each of the mixed compounds was uniformly dispersed in polymethyl methacrylate. The resulting sheet was then tested for transmittance of an ultraviolet visible spectrum using a spectrophotometer and it was found that the ultraviolet light with a wavelength below 380 nm was almost completely screened.

In the drawing attached hereto, FIG. 1 is a graph representing the transmittance of the ultraviolet visible spectrum of the sheet in Example 1.

EXAMPLES 7-12

One part by weight each of the compounds shown in Table 1 was blended with 99.0 parts by weight of polyethylene terephthalate, and the blend was then dried with heating for 10 hours under reduced pressure of 0.1 mmHg. Subsequently, the resulting product was extruded from an extruder of 290° C. to afford a 0.1 mm thick sheet. The compound was uniformly compatibilized with each of these sheets. The sheet was tested for transmittance of an ultraviolet visible spectrum, and it was found that the ultraviolet light with a wavelength below 380 nm was screened almost completely.

Figure 2:
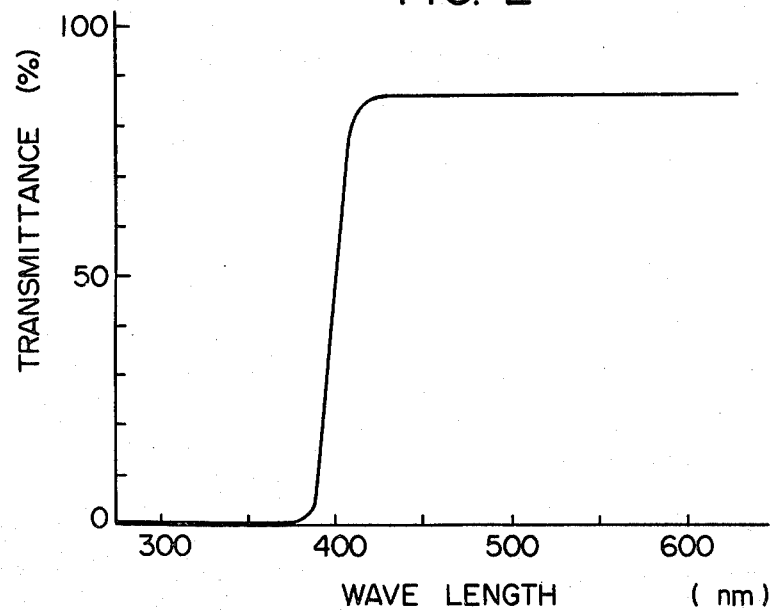

In the attached drawing, FIG. 2 is a graph representing the transmittance of the ultraviolet visible spectrum of the sheet in Example 11.

EXAMPLE 13

The procedure of Example 11 was repeated except that the amount of Naphthol AS-BR was changed from 1.0 part by weight to 0.1 part by weight. In consequence, a 0.1 mm thick sheet was obtained. The sheet was tested for transmittance of an ultraviolet visible spectrum, and it was found that the ultraviolet light with a wavelength below 370 mm was almost completely screened.

EXAMPLE 14

The procedure of Example 11 was repeated except that the amount of Naphthol AS-BR was changed from 1.0 part by weight to 20 parts by weight. As a result, there was obtained a 0.1 mm thick sheet. The resulting sheet was tested for transmittance of an ultraviolet visible spectrum and it was found that the ultraviolet light with a wavelength below 395 nm was screened almost completely.

EXAMPLES 15-20

Ten parts by weight each of the compounds shown in Table 1, 20 parts by weight of a polyamide resin (Sanmide S-150: a product of Sanyo Chemical Industries, Ltd.) and 70 parts by weight of a mixed organic solvent of ethyl acetate, isopropyl alcohol and toluene at a ratio of 1:3:6 were kneaded by attriter. Subsequently, the resulting mixture was coated on a polypropylene film 50 μm in thickness by means of a gravure printing machine so that a coating thickness after dried became 5 μm. The coated film was then tested for transmittance of an ultraviolet visible spectrum, and it was found that the ultraviolet light with a wavelength below 380 nm was screened almost completely.

Figure 3:
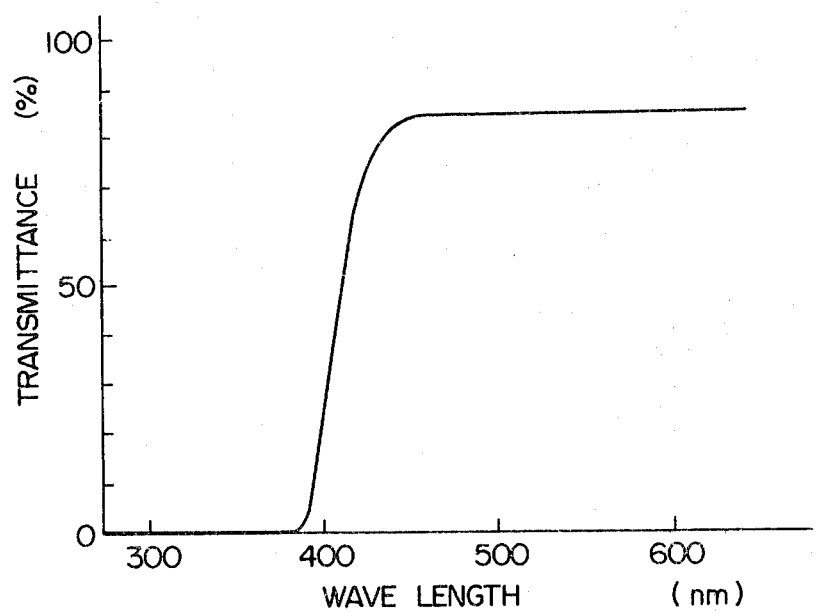

In the attached drawing, FIG. 3 is a graph representing the transmittance of the ultraviolet visible spectrum of the coated film in Example 16.

EXAMPLE 21

The procedure of Example 16 was repeated except that the amount of Naphthol AS-LC was changed from 10 parts by weight to 0.4 part by weight. Consequently, a coated polypropylene film resulted. The coated film was tested for transmittance of an ultraviolet visible spectrum, and it was found that the ultraviolet light with a wavelength below 375 nm was screened almost completely.

EXAMPLE 22

The procedure of Example 16 was repeated except that the amount of Naphthol AS-LC was changed from 10 parts by weight to 30 parts by weight. As a result, there was obtained a coated polypropylene film. The coated film was tested for transmittance of an ultraviolet visible spectrum, and it was found that the ultraviolet light with a wavelength below 395 nm was screened almost completely.

REFERENTIAL EXAMPLE

A heat loss was determined in order to compare the compounds used in this invention and the commercially available typical ultraviolet absorbers with respect to the heat stability and submimation resistance.

Five grams each of the compounds used in this invention and the known ultraviolet absorbers was weighed accurately and left in a dryer of 200° C. for 3 hours. The weight was then measured and the heat loss was determined. The results are shown in Table 2.

From Table 2, it becomes apparent that the heat loss of the compounds used in this invention is about ⅛ to 1/10 of the heat loss of the known ultraviolet absorbers.

TABLE 2

| Ultraviolet absorbing compound | Heat loss (%) |
|---|---|
| This invention | |
| 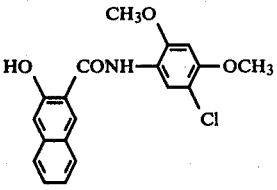 (Naphthol AS-ITR) | 0.7 |
| 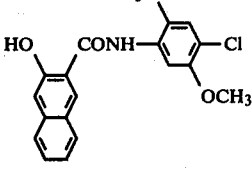 (Naphthol AS-LC) | 0.7 |
| 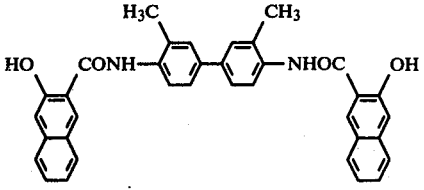 (Naphthol AS-BM) | 0.5 |
| 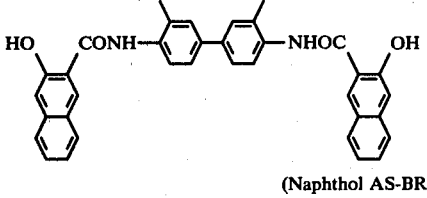 (Naphthol AS-BR) | 0.5 |

TABLE 2-continued

| Ultraviolet absorbing compound | Heat loss (%) |
|---|---|
| 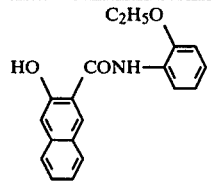 (Naphthol AS-PH) | 0.7 |
| 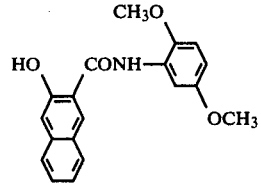 (Naphthol AS-BG) | 0.6 |
| Control | |
| 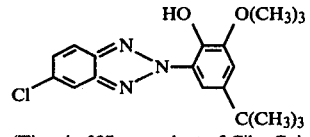 (Tinuvin 327: a product of Ciba Geigy) | 5.3 |
| 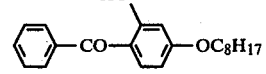 (Seesorb 102: a product of Shiroishi Calcium K.K.) | 2.0 |

What we claim is:

1. A resin composition capable of substantially completely absorbing light with a wavelength below 370 nm comprising at least one compound (A) selected from the group consisting of 5'-chloro-3-hydroxy-2',4'-dimethoxy-2-naphthanilide, 4'-chloro-3-hydroxy-2',5'-dimethoxy-2-naphthanilide, 3,3''-dihydroxy-4,4''''-bi-2-naphtho-O-toluidide and 3,3''-dihydroxy-4',4'''-bi-2-naphth-O-anisidide in at least one thermoplastic resin selected from the group consisting of polycarbonate resins, polyester resins and polyamide resins.

2. The resin composition of claim 1 wherein the compound (A) is contained in an amount of 0.01 to 50 parts by weight per 100 parts by weight of the thermoplastic resin.

3. The resin composition of claim 1 wherein the thermoplastic resin is a thermoplastic resin composed mainly of polycarbonate.

4. The resin composition of claim 1 wherein the thermoplastic resin is a thermoplastic resin composed mainly of a polyester.

5. The resin composition of claim 1 wherein the thermoplastic resin is polyethylene terephthalate.

6. The resin composition of claim 5 wherein the compound (A) is present in an amount of 0.01 to 50 parts by weight per 100 parts by weight of the polyethylene terephthalate thermoplastic resin.

7. The resin composition of claim 1 wherein the thermoplastic resin is a polyamide resin.

8. The resin composition of claim 7 wherein the compound (A) is contained in an amount of 0.1 to 50 parts by weight per 100 parts by weight of the polyamide resin.

* * * * *